(12) United States Patent
Wiedemann et al.

(10) Patent No.: US 6,866,808 B2
(45) Date of Patent: Mar. 15, 2005

(54) METHOD FOR PRODUCING MOLDINGS

(75) Inventors: Ralf Wiedemann, Griesheim (DE); Natascha Daschner, Altrip (DE); Axel Halbherr, Frankenthal (DE); Jacobus Simon Petrus Van Diepen, Berkshire (GB); Ludwig Hertling, Biblis (DE)

(73) Assignee: Reckitt Benckiser N.V., Hoofddorp (NL)

( * ) Notice: Subject to any disclaimer, the term of this patent is extended or adjusted under 35 U.S.C. 154(b) by 0 days.

(21) Appl. No.: 10/066,943

(22) Filed: Feb. 4, 2002

(65) Prior Publication Data

US 2002/0163103 A1 Nov. 7, 2002

Related U.S. Application Data

(63) Continuation of application No. PCT/EP00/07473, filed on Aug. 2, 2000.

(30) Foreign Application Priority Data

Aug. 5, 1999 (DE) .......................................... 199 36 235

(51) Int. Cl.[7] .............................................. B29C 45/32
(52) U.S. Cl. ................................. 264/297.2; 264/297.8; 264/328.1; 264/328.8; 425/588; 425/464
(58) Field of Search .......................... 264/297.2, 297.8, 264/328.1, 328.8; 425/588, 464

(56) References Cited

U.S. PATENT DOCUMENTS

| | | | | |
|---|---|---|---|---|
| 2,335,294 A | * | 11/1943 | Meyer ......................... | 264/161 |
| 4,206,069 A | * | 6/1980 | Borrello ..................... | 510/445 |
| 4,946,633 A | * | 8/1990 | Saeki et al. ................ | 264/40.1 |
| 5,009,425 A | * | 4/1991 | Okumoto et al. ........... | 473/348 |
| 5,286,755 A | * | 2/1994 | Kauffmann et al. ......... | 514/772 |
| 5,316,712 A | * | 5/1994 | Ono et al. .................. | 264/102 |
| 5,496,488 A | * | 3/1996 | Kacher et al. .............. | 510/146 |
| 5,792,406 A | * | 8/1998 | Wada et al. ................. | 264/157 |
| 6,056,842 A | * | 5/2000 | Dalton et al. ............... | 156/243 |
| 6,291,715 B1 | * | 9/2001 | Ruider et al. ............... | 564/497 |
| 6,303,065 B1 | * | 10/2001 | Reid et al. .................. | 264/248 |
| 6,303,560 B1 | * | 10/2001 | Hartan et al. ............... | 510/446 |
| 6,338,840 B1 | * | 1/2002 | Allan et al. .................. | 424/65 |
| 6,468,381 B1 | * | 10/2002 | Morgan ................. | 156/244.19 |

FOREIGN PATENT DOCUMENTS

| | | |
|---|---|---|
| DE | 38 14 257 A1 | 11/1988 |
| DE | 42 04 285 A1 | 8/1993 |
| DE | 195 02 468 A1 | 8/1996 |
| DE | 198 34 180 A1 | 2/2000 |
| EP | 0 730 938 A1 | 9/1996 |
| JP | 08001722 A1 | 1/1996 |

OTHER PUBLICATIONS

Rosato, Donald V. and Dominick V. Rosato. Injection Molding Handbook (2nd ed.). New York: Chapman and Hall, 1995. p. 239.*

* cited by examiner

*Primary Examiner*—Michael P. Colaianni
*Assistant Examiner*—Monica A. Fontaine
(74) *Attorney, Agent, or Firm*—Akin Gump Strauss Hauer & Feld, LLP

(57) ABSTRACT

A method is provided for producing a plurality of moldings in one mold wherein the mold has at least one introduction point for molding material and a plurality of cavities with a shape corresponding to that of the moldings. The cavities are arranged so that each cavity, except cavities in an end or peripheral position, is connected to at least two directly adjacent cavities. A fluid casting compound of a material having a solidified hardness of not more than about 200 N, defined as the force at which an 11 mm sphere of the material will shatter, is introduced into the mold, so that it essentially fills all of the cavities, and the casting compound is then solidified and removed from the mold.

6 Claims, 1 Drawing Sheet

METHOD FOR PRODUCING MOLDINGS

CROSS-REFERENCE TO RELATED APPLICATIONS

This application is a continuation of International Application No. PCT/EP00/07473, filed Aug. 2, 2000, the disclosure of which is incorporated herein by reference.

BACKGROUND OF THE INVENTION

The invention relates to a mold for producing a plurality of moldings, in particular by injection molding, and a method using such a mold.

Injection molding is a very modern, economical method of producing moldings and is particularly well suited to automated mass production. Injection molding consists in heating a heat-deformable casting compound until it becomes liquid, and injecting it under pressure into closed, multi-part hollow molds, which are usually made from steel and cooled by water, where it cools and solidifies.

Polystyrene, polyamides, polyurethanes, cellulose ether and ester, polyethylene, polymethacrylic acid esters, and other heat-deformable materials, thermo-setting plastics which set in the mold or vulcanized elastomers of rubber or silicon rubber, as well as foam plastics, may be used as casting compounds. Wax-type or gel-type materials may also be used, in which case they will generally not have to be heated to such a high degree in order to reach the viscosity needed for the injection molding process.

A standard injection mold has passages extending from one or more injection points and leading to the cavities, which correspond to the structure of the moldings. An injection molding process of this type generally produces moldings joined by webs in a single molded workpiece. The moldings have to be separated from these webs by an appropriate finishing process, which requires at least one additional work step, on the one hand, and leaves behind waste material in the form of the connecting webs, on the other hand. Moreover, the number of moldings which can be produced in one mold is limited.

BRIEF SUMMARY OF THE INVENTION

Accordingly, an underlying objective of the invention is to propose a method of producing moldings, in particular an injection molding process, and to develop an appropriate mold for the molding process, by which time can be saved by producing a large number of moldings without the need for any finishing and/or without generating any significant amount of waste material.

This objective is achieved according to the invention by a mold for producing a plurality of moldings, characterized by at least one point for introducing a casting compound; and a plurality of cavities having a shape corresponding to the moldings, which are laid out in such a way that—with the exception of the cavities in an end or peripheral position—every cavity is linked to at least two closely adjacent cavities.

In one embodiment of the invention, the cavities are arranged in a row. In another embodiment of the invention, the cavities are arranged so that—apart from the cavities in the peripheral position—every cavity is arranged closely adjacent to four to six other cavities.

Particularly preferred, a single point is provided for introducing the casting compound and is preferably arranged at the center of the layout of the cavities. In a preferred embodiment of the invention, the cavities have an essentially spherical shape.

The invention is additionally directed to a method of producing a plurality of moldings, which is characterised by a fluid casting compound being introduced into a mold according to the invention, such that all cavities are essentially completely filled.

The material used as the casting compound is preferably one which, once it has solidified in the mold, has a hardness of at most about 200 N, preferably about 20 to 120 N, defined as being the force at which an 11 mm sphere of the material will shatter. Preferably, a composition containing surface-active agent is used as the molding compound. The method according to the invention is preferably an injection molding process.

Because the cavities are arranged closely adjacent to one another as according to the invention and are linked to one another by relatively short and narrow connecting passages, a large number of moldings can be made in a short time. There is usually no need for additional processing, because the connecting webs are so short and thin that the moldings break up into individual pieces as they are being emptied out of the mold (usually without problems). As a result, the moldings are left with only minimal linkage points, which are usually tolerable, and there is almost no waste material. Furthermore, tests conducted to date have shown that it is not a problem even if some material remains behind in the connecting passages between the cavities, especially with injection molding, because this will normally be pushed out of them during the next molding run (even at relatively low pressures in the case of injection molding).

The method according to the invention may be implemented in a particularly practical manner if the casting compounds used are ones which, once they have solidified in the mold, have a hardness of at most about 200 N, preferably about 20 to 120 N, defined as the force at which a sphere of the respective material with a diameter of 11 mm shatters. Once they have solidified, materials of this type make it easier to empty the mold and often totally obviate the need for additional processing of the moldings. The method is in effect basically suitable for all other types of casting compounds for making a large number of moldings in one mold while generating only a small quantity of waste material. However, with harder materials (e.g., plastics), the moldings have to be broken up separately as a rule, i.e., the short webs have to be separated from one another, which means that a certain amount of additional processing will be necessary in many cases. The advantages of the method according to the invention are therefore more particularly in evidence when using relatively soft materials having the maximum hardness specified above.

Preferably, the mold according to the invention and the method according to the invention are applied to injection molding. The example described below is also primarily suited thereto. However, the invention may also be used with other methods of producing moldings. For example, the described molds and the described method may be used with any type of casting method in which a mold is filled with an appropriate casting compound.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not

DETAILED DESCRIPTION OF THE INVENTION

Figure 1:
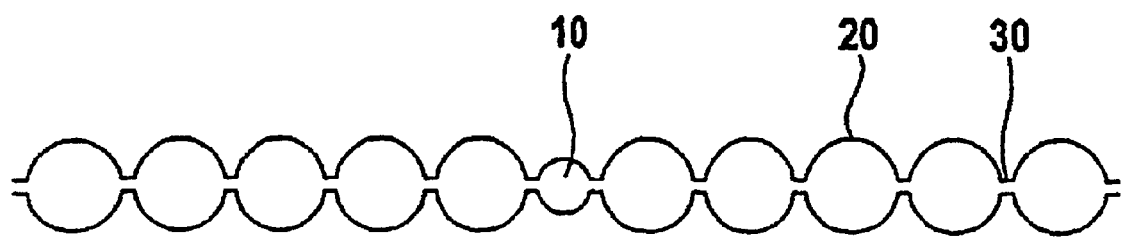
FIG. 1 is a schematic diagram of one embodiment of a half-mold according to the invention.

FIG. 1 depicts one possible embodiment of a mold according to the invention, in which the cavities 20 are arranged in a row, the injection point 10 for the casting compound being provided at the center of this row. The cavities 20 need not necessarily be arranged one after the other in a straight line, as illustrated in FIG. 1, but may be disposed in a meandering arrangement instead, i.e., in adjacently lying rows in which the hollow bodies within the respective rows are connected relative to one another and the respective rows are connected one to the other by a connecting passage between the respective cavities at the end position of the rows alternately at opposite ends.

The connections between the injection point 10 and the adjacent cavities 20 and between the individual cavities 20 are provided in the form of passages 30 which are as short as possible, having the smallest possible diameter and the smallest possible cross section edge length. The exact dimensions will vary depending on the casting compound used, but are generally in a range of about 0.1 to 5 mm in length, preferably about 0.2 to 2 mm, even more preferably about 0.3 to 1 mm, and preferably about 0.5 to 3 mm in diameter and 2 mm in cross section edge length.

Figure 2:
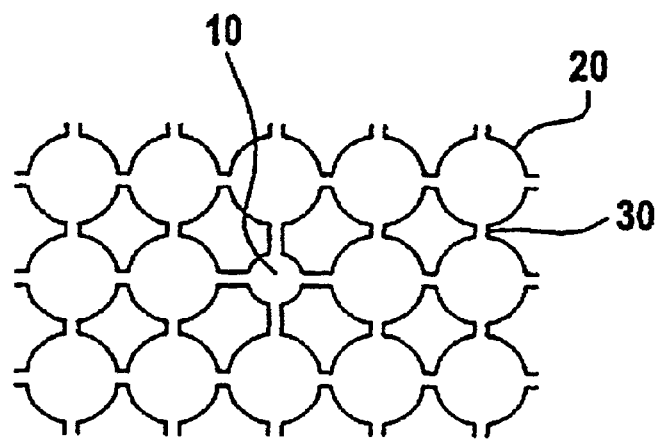
FIG. 2 is a schematic diagram of another embodiment of a half-mold according to the invention.

FIG. 2 depicts another layout of the cavities, in which the injection point 10 is again centrally disposed, but where the cavities are arranged in horizontal rows, which means that there are also adjacent vertical rows. Each cavity—with the exception of those at the periphery—has four respective, closely adjacent cavities (lattice pattern).

Figure 3:
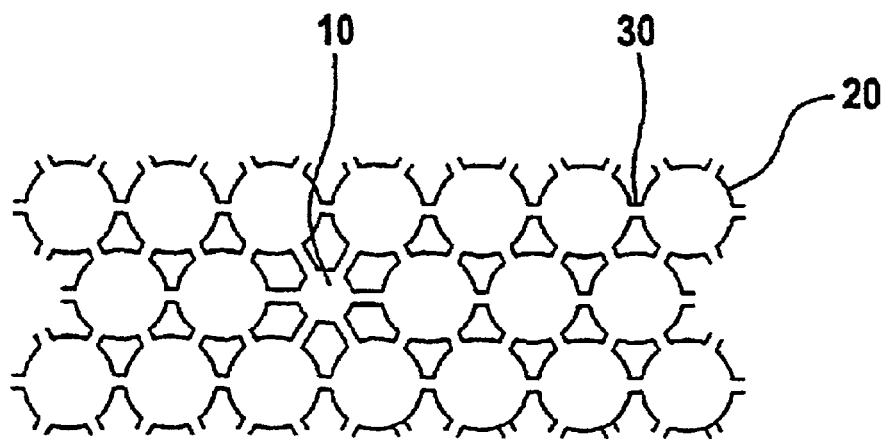
FIG. 3 is a schematic diagram of a third embodiment of a half-mold according to the invention.

A similar structure, but with an even greater density of cavities for the same surface area, is a layout in which the rows are offset from one another, as illustrated in FIG. 3. This results in a honeycomb structure, i.e., every cavity—again with the exception of those at the periphery and adjacent to the injection point—has six closely adjacent cavities.

The diagrams of the layouts of cavities in FIG. 2 and FIG. 3 show the maximum possible number of connecting passages 30 between these cavities 20. Depending on what material is used and possibly other process parameters, such as the injection pressure, not all of these passages need necessarily be open, i.e., be used in the actual mold. The essential factor is that connecting passages are disposed so that the mold can be filled from cavity to cavity, this being a basic principle of the present invention. The opening of the connecting passages 30 between the cavities 20 may be selected so that the casting compound spreads substantially uniformly from the injection point 10, i.e., any potential back-flows or cross-flows are avoided.

A person of ordinary skill in the art will be able to conduct simple tests to determine the optimum number of connecting passages between the cavities for a specific material. The dimensions of the connecting passages between the cavities in FIG. 2 and FIG. 3 are in the same order of magnitude as those of the embodiment illustrated in FIG. 1.

EXAMPLE

Injection molds were made in all three of the design variants described above. The cavities, which were spherical in shape, had a diameter of approximately 11 mm. The connecting passages between these cavities were 0.4 mm in length with cross section dimensions of 2 mm×1 mm.

The row layout illustrated in FIG. 1 had 10 cavities, 5 arranged one after the other in a row respectively to the right and to the left of the injection point. In the lattice-type structure illustrated in FIG. 2, 120 spherical cavities were provided. Using a layout as illustrated in FIG. 3, with molds of a same size, even more cavities can be accommodated in a mold. For example, initial tests have already been conducted with a mold incorporating approximately 800 cavities. However, it would be perfectly conceivable to work with dimensions incorporating 2000 to 2500 cavities or even more.

Compounds containing surfactants were used as the casting compound to make spherical moldings for use in the detergent art, such as described in German published patent application DE 198 34 180. In the following table, setting out some of the test results: Solid 20 stands for polyethylene glycol with a mean relative molecular weight of 20,000 (PEG 20,000); Solid 35 is a polyethylene glycol with a mean relative molecular weight of 35,000 (PEG 35,000); and Liquid 30 is the surfactant Synperonic®RA30, a polyethylene oxide/propylene oxide bonded to a $C_{13}$–$C_{15}$ alcohol ($C_{13}$–$C_{15}O(EO)_6(PO)_3$).

|  | Viscosity [mPa.s]* | Temperature of casting compound on injection [° C.] | Hardness of resultant sphere [N] |
| --- | --- | --- | --- |
| Solid 20 (50%) Liquid 30 (50%) | at 80° C. = 2750 at 90° C. = 2450 at 100° C. = 2350 | 75–85 | 40–50 |
| Solid 20 (70%) Liquid 30 (30%) | at 80° C. = 5000 at 90° C. = 4000 at 100° C. = 3300 | 80–85 | 70–80 |
| Solid 35 (50%) Liquid 30 (50%) | at 80° C. = 9500 at 90° C. = 5400 at 100° C. = 3950 | 95–105 | 45–55 |

*LVTD-viscometer, Spinner 25

In order to test the hardness of the material, the spheres (diameter 11 mm) were tested on an Erichsen 486 force-measuring device. The force at which the sphere breaks is measured. As may be seen from the table above, all the material hardness values lie within the preferred range of about 20 to 120 N.

In all cases, it was possible to process the materials in the described molds without any problem, using a relatively low injection pressure of less than 100 bar. The spheres solidified in 50–60 seconds when the mold was cooled to 10 to 15° C. When the mold was opened and emptied, the spheres separated individually without any problem. There was no need for further processing. Even though some mold webs were left on the spheres, these broke off as the spheres were conveyed away, i.e., as the spheres rolled on their surfaces.

The characterizing features of the invention disclosed in the description above, in the claims and in the drawings may essentially be used both individually and in any combination to implement the invention in its different embodiments.

It will be appreciated by those skilled in the art that changes could be made to the embodiments described above without departing from the broad inventive concept thereof.

It is understood, therefore, that this invention is not limited to the particular embodiments disclosed, but it is intended to cover modifications within the spirit and scope of the present invention as defined by the appended claims.

We claim:

1. A method of producing a plurality of moldings in one mold, comprising providing a mold which has a plurality of cavities having a shape corresponding to the moldings, the cavities being arranged in the mold in such a way that, except for cavities in an end or peripheral position of the mold, each of the cavities is linked to at least two closely adjacent cavities and has connecting passages such that the mold can be filled from cavity to cavity, providing a fluid casting compound of material containing a surfactant, the material having a solidified hardness of at most about 200 N, the hardness being defined as the force at which an 11 mm sphere of the material will shatter, introducing the fluid casting compound into the mold at at least one point such that all of the cavities become essentially completely filled with the casting compound, solidifying the casting compound to produce moldings, and removing the moldings from the mold.

2. The method as claimed in claim 1, wherein the material of the casting compound has a solidified hardness of about 20 to 120 N.

3. The method as claimed in claim 1, wherein each of the cavities, except for cavities in a peripheral position of the mold, is arranged closely adjacent to four to six other of the cavities.

4. The method as claimed in claim 1, wherein the casting compound is introduced at a single point, which is located centrally in the mold.

5. The method as claimed in claim 1, which is an injection molding method.

6. The method as claimed in claim 1, wherein the shape corresponding to the moldings is spherical.

* * * * *